_(12)_ United States Patent
Fiyak et al.

(10) Patent No.: US 9,798,543 B2
(45) Date of Patent: Oct. 24, 2017

(54) FAST MAPPING TABLE REGISTER FILE ALLOCATION ALGORITHM FOR SIMT PROCESSORS

(75) Inventors: Michael Fiyak, Madison, AL (US); Ming Y. Siu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2031 days.

(21) Appl. No.: 12/875,944

(22) Filed: Sep. 3, 2010

(65) Prior Publication Data

US 2011/0072438 A1 Mar. 24, 2011

Related U.S. Application Data

(60) Provisional application No. 61/245,602, filed on Sep. 24, 2009.

(51) Int. Cl.
*G06F 9/30* (2006.01)
*G06F 9/38* (2006.01)

(52) U.S. Cl.
CPC .......... *G06F 9/3009* (2013.01); *G06F 9/3012* (2013.01); *G06F 9/30123* (2013.01); *G06F 9/3851* (2013.01)

(58) Field of Classification Search
CPC ............................ G06F 9/3012; G06F 9/30123

USPC ........................................................... 712/217
See application file for complete search history.

(56) References Cited

U.S. PATENT DOCUMENTS

| | | | |
|---|---|---|---|
| 5,852,726 A * | 12/1998 | Lin et al. ....................... | 712/200 |
| 7,568,083 B1 * | 7/2009 | Chen et al. .................... | 711/220 |
| 8,583,901 B2 * | 11/2013 | Zhu et al. ...................... | 712/217 |
| 2005/0027968 A1 * | 2/2005 | Rupley et al. ................. | 712/217 |
| 2005/0060520 A1 * | 3/2005 | Cascaval et al. ............. | 712/225 |
| 2009/0327661 A1 * | 12/2009 | Sperber et al. ............... | 712/217 |

* cited by examiner

*Primary Examiner* — Yuqing Xiao
(74) *Attorney, Agent, or Firm* — Artegis Law Group, LLP

(57) ABSTRACT

One embodiment of the present invention sets forth a technique for allocating register file entries included in a register file to a thread group. A request to allocate a number of register file entries to the thread group is received. A required number of mapping table entries included in a register file mapping table (RFMT) is determined based on the request, where each mapping table entry included in the RFMT is associated with a different plurality of register file entries included in the register file. The RFMT is parsed to locate an available mapping table entry in the RFMT for each of the required mapping table entries. For each available mapping table entry, a register file pointer is associated with an address that corresponds to a first register file entry in the plurality of register file entries associated with the available mapping table entry.

20 Claims, 10 Drawing Sheets

FAST MAPPING TABLE REGISTER FILE ALLOCATION ALGORITHM FOR SIMT PROCESSORS

CROSS-REFERENCE TO RELATED APPLICATIONS

This application claims priority benefit to United States provisional patent application titled, "FAST MAPPING TABLE REGISTER FILE ALLOCATION ALGORITHM FOR SIMT PROCESSORS," filed on Sep. 24, 2009 and having Ser. No. 61/245,602.

BACKGROUND OF THE INVENTION

Field of the Invention

The present invention generally relates to physical memory systems and, more specifically, to systems and methods for a fast mapping table register file allocation algorithm for single instruction multiple thread (SIMT) processors.

Description of the Related Art

State of the art graphics chips include a plurality of processing cores, where each processing core included in the plurality of processing cores executes a plurality of threads, commonly referred to as "thread groups." Each processing core includes a register file that typically includes one-thousand and twenty-four registers that may be allocated to the thread groups. Each thread group can have a variable number of registers allocated from the register file, ranging from as few as two registers to as many as sixty-four register per thread group.

The execution order of thread groups is highly variable and often leads to allocation fragmentation within the register file. Consider a simple linear register file allocation scheme, where the register file requirements of each thread group are handled using a first-in-first-out (FIFO) technique. More specifically, a head pointer indicates the oldest allocated register while a tail pointer indicates the most-recently allocated register. If a thread group terminates early—specifically, a thread group that is associated with registers that are allocated between the head and the tail—a "hole" in the allocations of the register file is established, causing memory fragmentations within the processing core.

Accordingly, what is needed in the art is a technique for a more efficient out-of-order allocation of registers included in a register file.

SUMMARY OF THE INVENTION

A system and method for an improved technique for allocating register file entries included in a register file to a thread group. A request to allocate a number of register file entries to the thread group is received. A required number of mapping table entries included in a register file mapping table (RFMT) is determined based on the request, where each mapping table entry included in the RFMT is associated with a different plurality of register file entries included in the register file. The RFMT is parsed to locate an available mapping table entry in the RFMT for each of the required mapping table entries. For each available mapping table entry, a register file pointer is associated with an address that corresponds to a first register file entry in the plurality of register file entries associated with the available mapping table entry.

Various embodiments of a system of the invention include a memory management unit (MMU) configured to efficiently allocate register file entries included in a register file to a thread group. The MMU comprises a register file allocator configured to receive a request to allocate a number of register file entries to the thread group, determine a required number of mapping table entries included in a register file mapping table (RFMT) based on the request, where each mapping table entry included in the RFMT is associated with a different plurality of register file entries included in the register file, parse the RFMT to locate an available mapping table entry in the RFMT for each of the required mapping table entries; and, for each available mapping table entry, associate with a register file pointer an address that corresponds to a first register file entry in the plurality of register file entries associated with the available mapping table entry.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
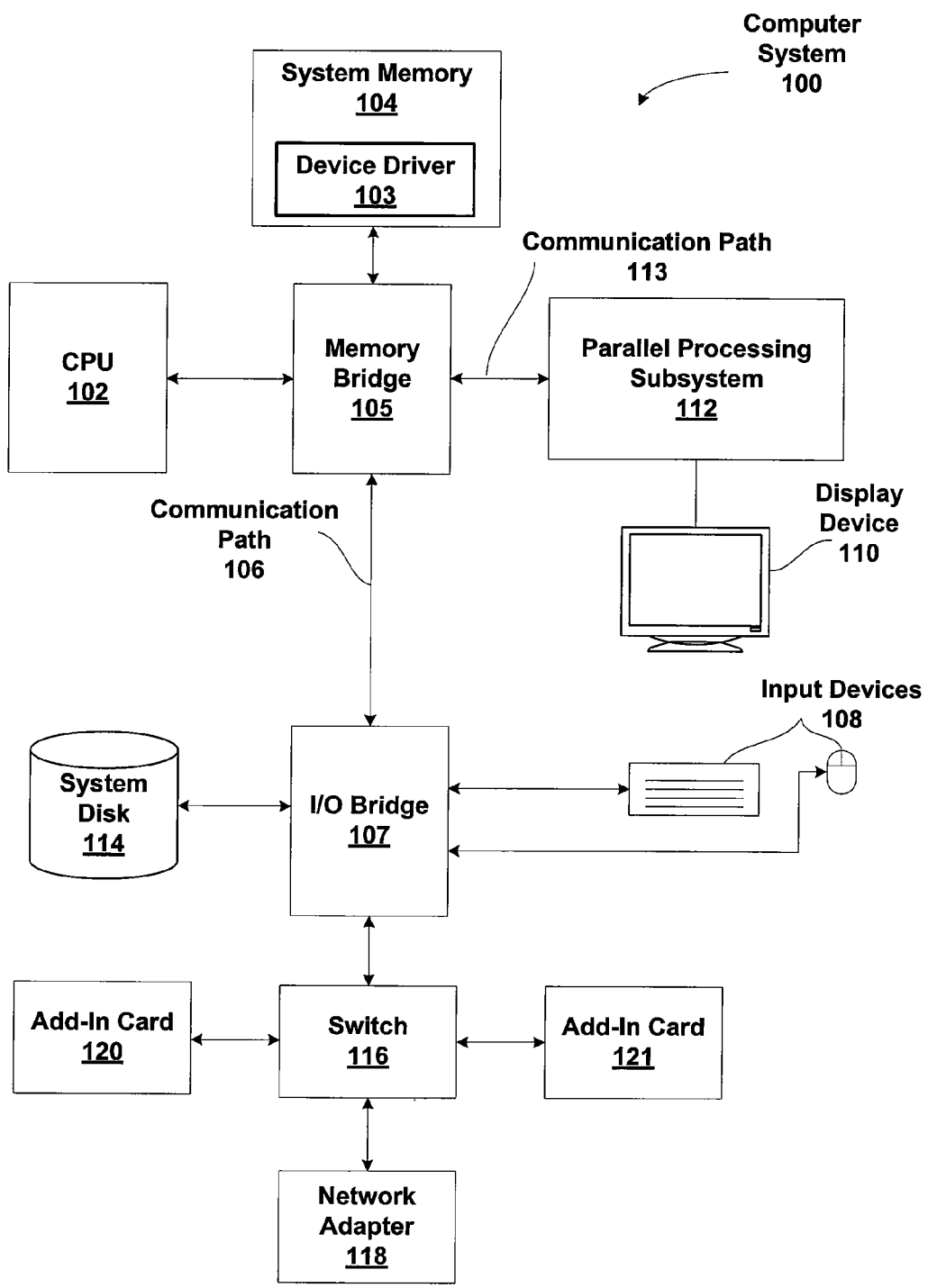
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point to point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
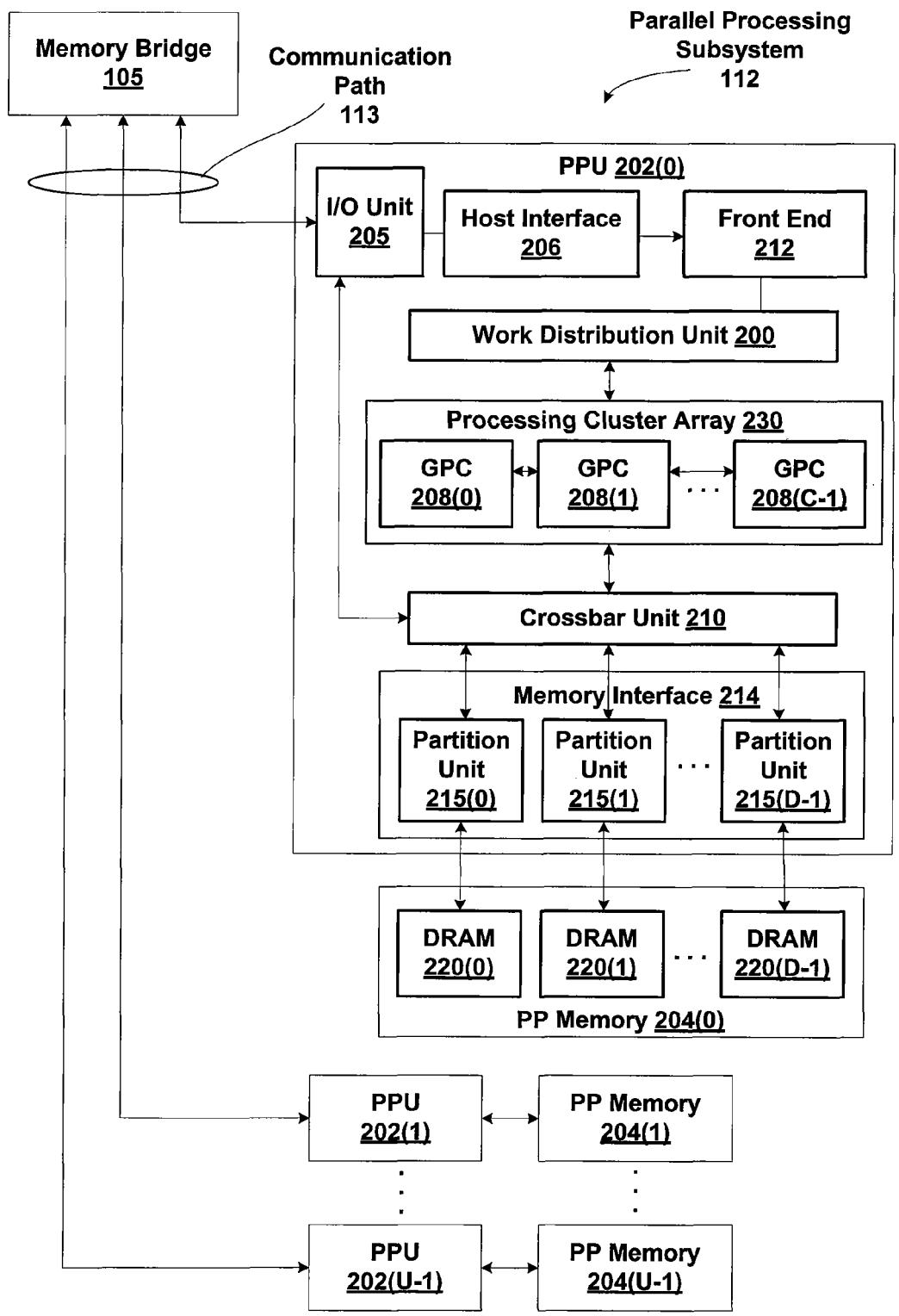
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each. PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals)

from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
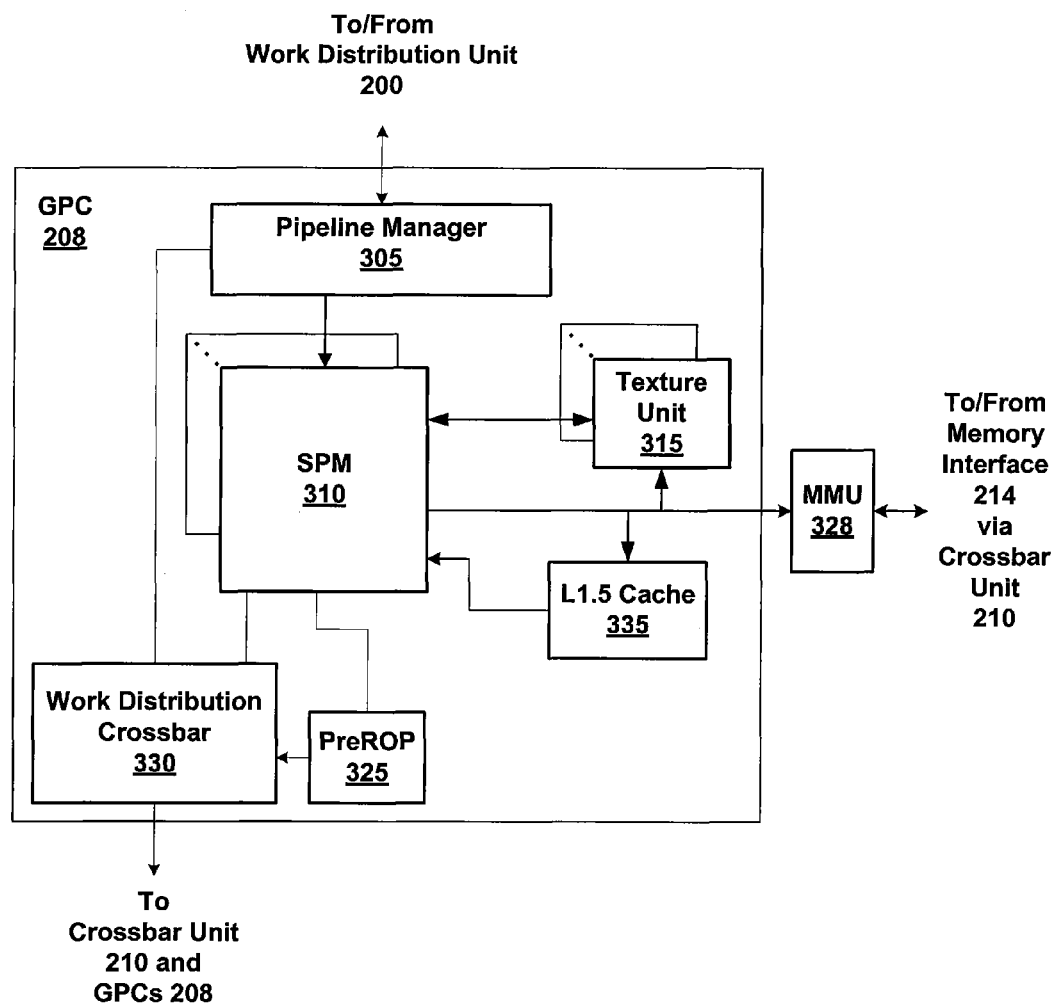
FIG. 3A is a block diagram of a general processing cluster (GPC) within one of the parallel processing units (PPUs) of FIG. 2, according to one embodiment of the present invention.

FIG. 3A is a block diagram of a general processing cluster (GPC) 208 within one of the parallel processing units (PPUs) 202 of FIG. 2, according to one embodiment of the present invention. Each GPC 208 may be configured to execute a large number of threads in parallel, where the term "thread" refers to an instance of a particular program executing on a particular set of input data. In some embodiments, single instruction, multiple data (SIMD) instruction issue techniques are used to support parallel execution of a large number of threads without providing multiple independent instruction units. In other embodiments, single instruction, multiple thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
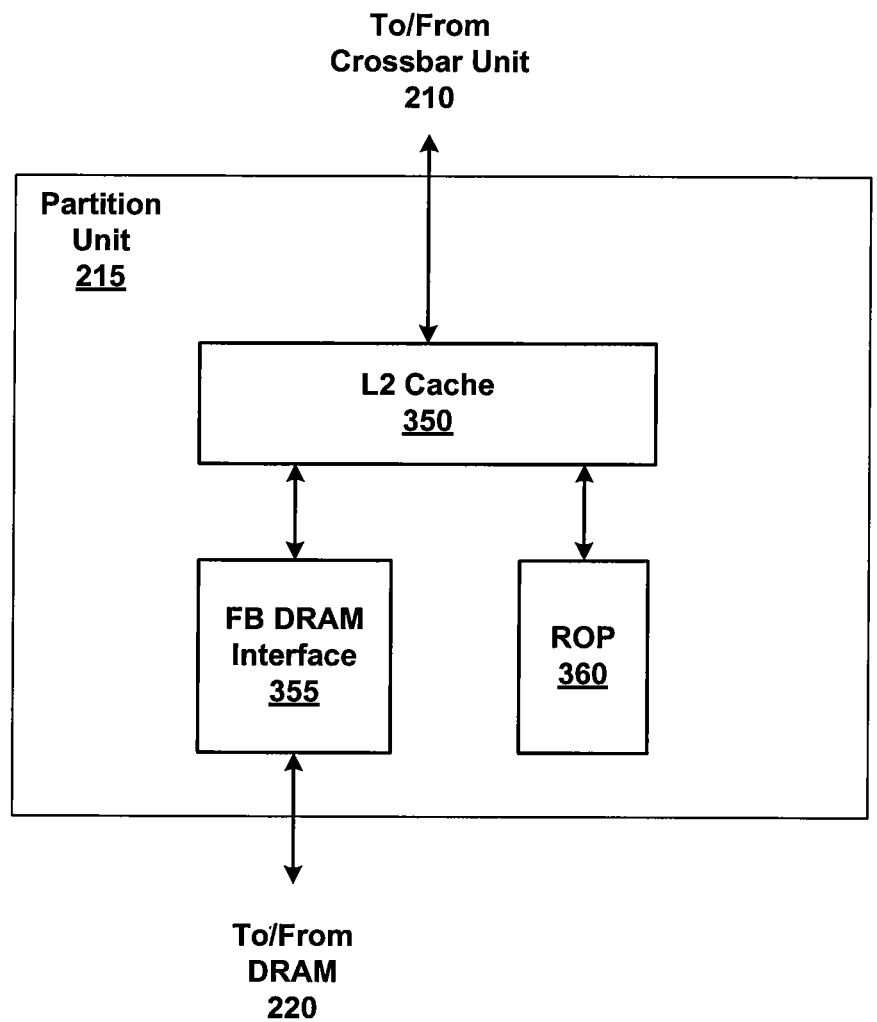
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
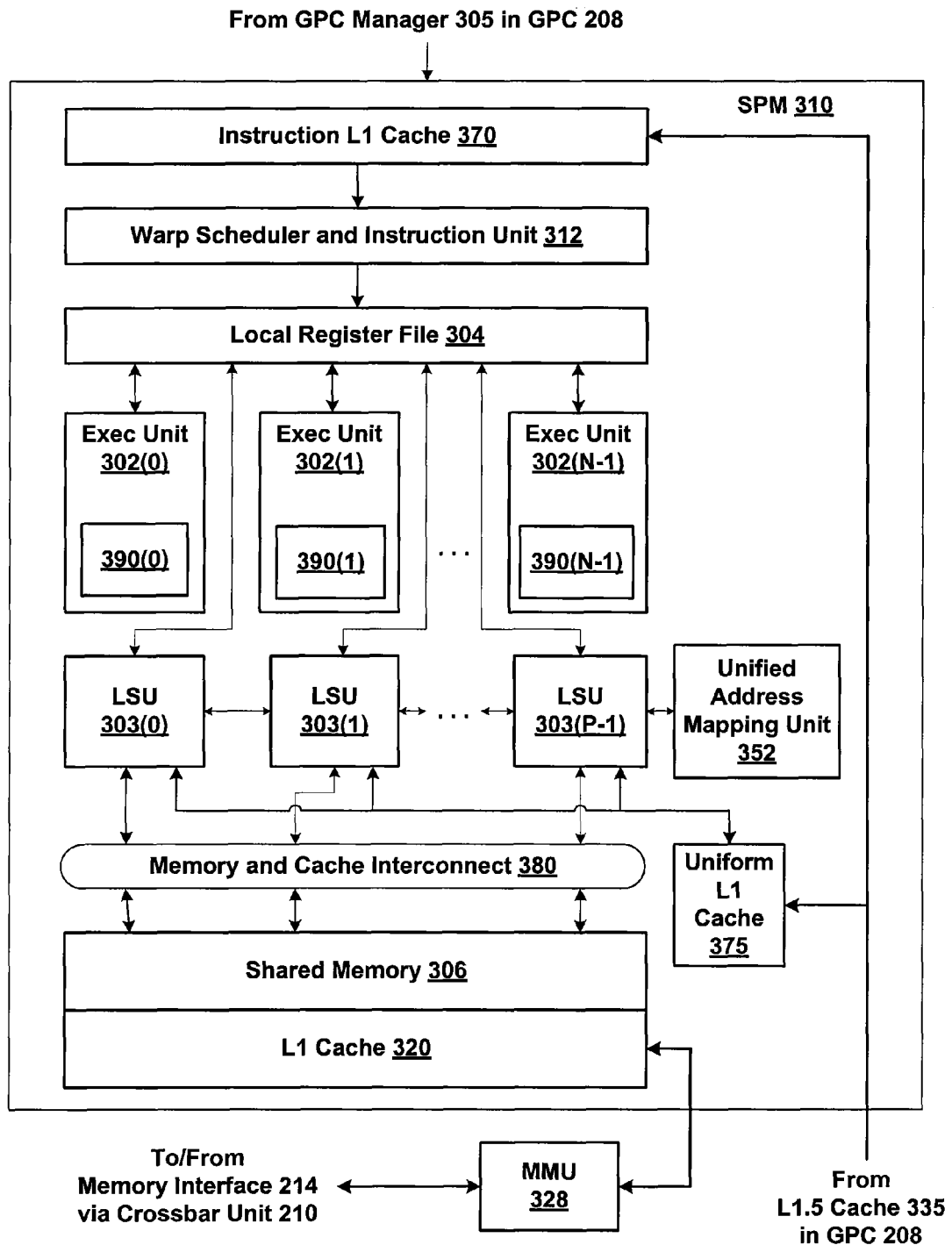
FIG. 3C is a block diagram of a portion of the streaming multiprocessor (SPM) of FIG. 3A, according to one embodiment of the present invention.

FIG. 3C is a block diagram of the streaming multiprocessor (SPM) 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Register File Mapping Table

Currently, the local register file 304 includes one hundred and twenty-eight rows by eight banks of registers. Thread groups that are executing within the SPM 310 may allocate from two to sixty-four of the registers included in the local register file 304. Non-linear allocation of the local register file 304 may be accomplished using a mapping table that maintains the registers that are allocated to each thread group that is executing within the SPM 310. To avoid allocation holes, such a mapping table is used instead of demanding contiguous registers included in the local register file 304 each time a thread group requires a number of registers.

A conventional mapping table implementation is typically configured to include one bit per register included in the local register file 304, where each bit indicates whether the corresponding register is free for allocation. The conventional mapping table is parsed to determine free registers, and the address of each register is stored in a pointer that is included in the thread group. However, up to sixty-four registers may be allocated to each thread group, where the address of each register is ten bits. Accordingly, each thread group could result in storing up to six hundred and forty bits of register file addresses, which is simply too large of a number.

Here, the conventional mapping table implementation is being modified to reduce the memory that is required to implement such a mapping table technique. First, a quantum of two is mandatory for register allocation, meaning that two to sixty-four registers may be allocated to each thread group as long as the number of allocated registers is even. Second, each entry of the mapping table corresponds to four contiguous registers and, if needed, each entry of the mapping table may be split to correspond to two contiguous registers. These regions are described herein as "4S" and "2S," respectively.

Figure 4A:
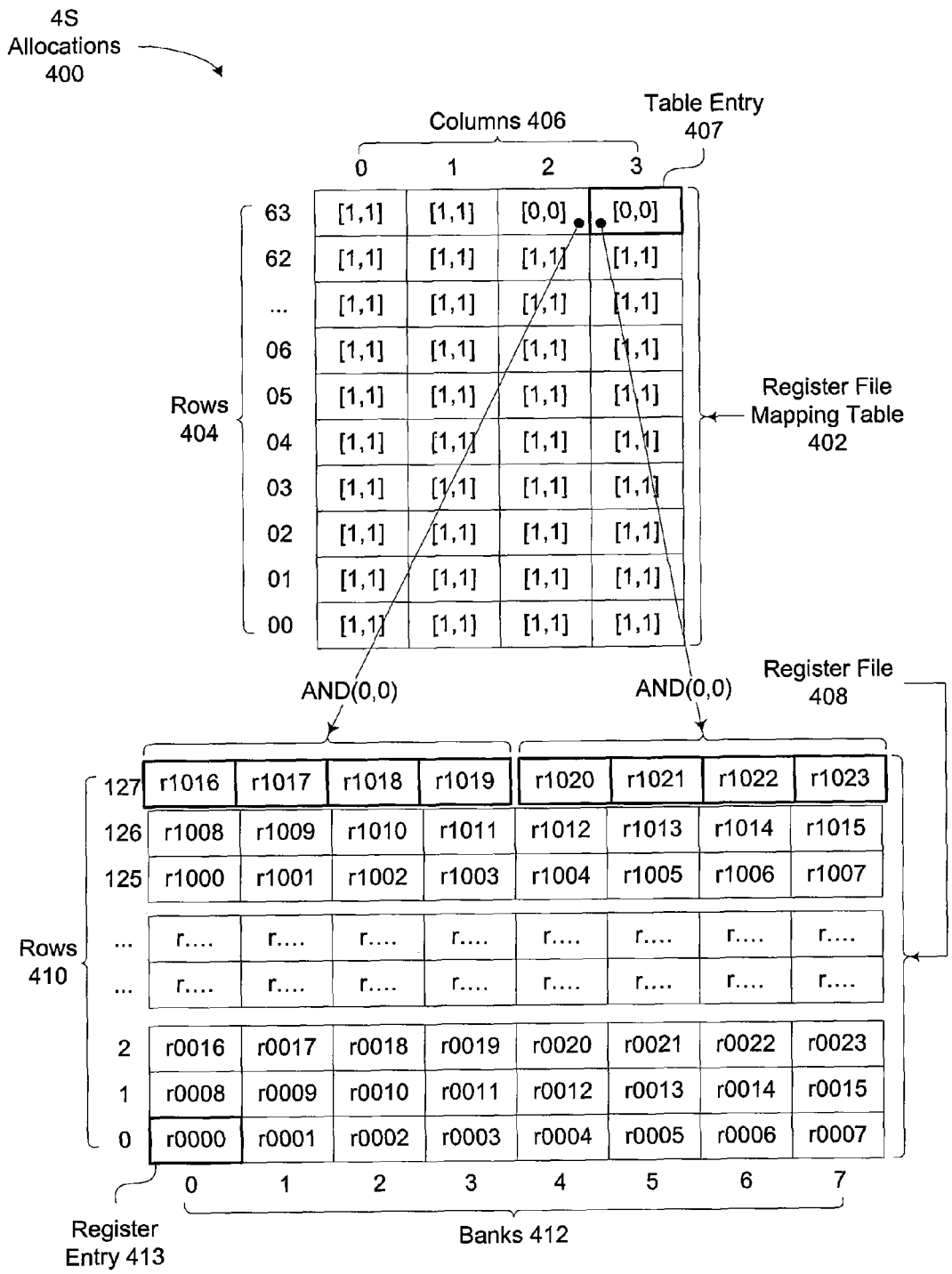
FIG. 4A illustrates 4S regions included in a register file mapping table, according to one embodiment of the present invention.

FIG. 4A illustrates 4S regions 400 included in a register file mapping table 402, according to one embodiment of the present invention. As shown, the register file mapping table 402 includes sixty-four rows 404 and four columns 406 of table entries 407, providing a total of two-hundred and fifty-six table entries 407. The register file 408 includes one-hundred and twenty-eight rows 410 and eight banks 412, providing a total of one thousand and twenty-four register entries 413. As also shown, each of the table entries 407 corresponds to four contiguous register entries 413 included in a register file 408. Accordingly, only eight bits are required to address each of the table entries 407 included in the register file mapping table 402, where the eight bits correspond to a starting register entry 413 and three subsequent and contiguous register entries 413, as described in further detail below in FIG. 6. For example, the table entry 407 of {row 63, column 2} of the register file mapping table 402 corresponds to four contiguous register entries. 413 of {row 127, banks 0-3} of the register file 408. Similarly, the table entry 407 of {row 63, column 3} of the register file mapping table 402 corresponds to four contiguous register entries 413 of {row 127, banks 4-7} of the register file 408.

Each table entry 407 includes two bits that are used to determine whether a 4S region is associated with the table entry 407. Such an associated 4S region is identified by performing a binary "AND" function on the two bits included in each of the table entries 407. For example, if a table entry 407 were to include bit values of [0,0], then the "AND" function would produce a value of 0, which would indicate that no 4S region is associated with the table entry 407. Alternatively, if a table entry 407 were to include bits [1,1], then the "AND" function would produce a value of 1, which would indicate that a 4S region is associated with the table entry 407. As one skilled in the art would readily understand, in an alternative embodiment, a value of 1 that results from the "AND" function may indicate that no 4S region is associated with the table entry 407, while a value of 0 that results from the "AND" function may indicate that a 4S region is associated with the table entry 407.

In general, if the bits included in a table entry 407 are of opposite value—that is, [1,0] or [0,1], then the "AND"

function produces a value of 0, which, as described above, indicates that no 4S region is associated with the table entry 407. In such a case, the two bits of opposite value indicate that a 2S region, not a 4S region, is associated with the table entry 407, as described in further detail below in FIG. 4B.

Figure 4B:
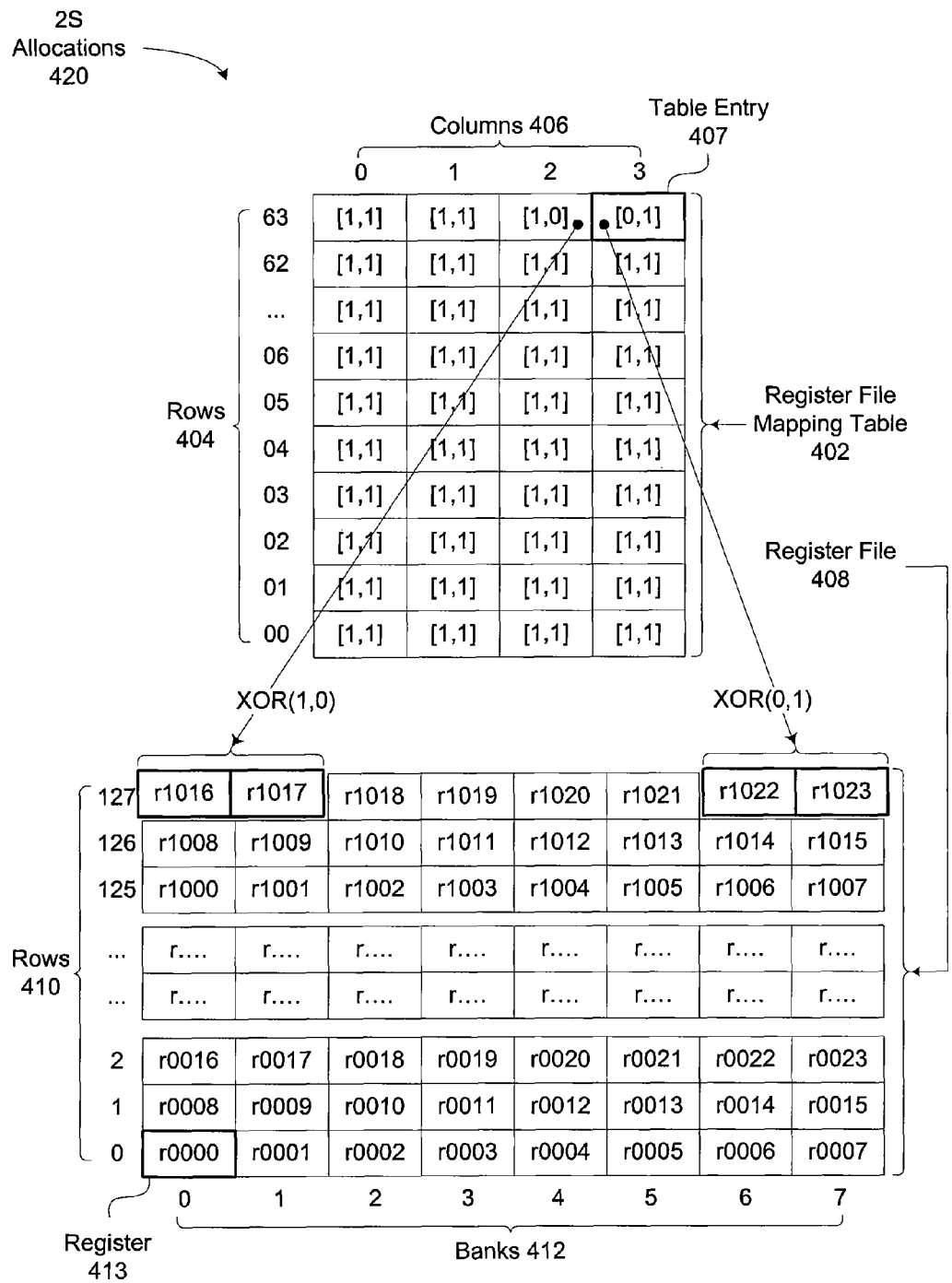
FIG. 4B illustrates 2S regions included in a register file mapping, according to one embodiment of the present invention.

FIG. 4B illustrates 2S regions 420 included in the register file mapping table 402, according to one embodiment of the present invention. As described above, a table entry 407 that includes two bits of opposite value indicates that a 2S region is associated with the table entry 407. 2S regions are identified by performing an "XOR" function on the two bits included in a table entry 407. For example, if the table entry 407 were to include bits [0,1] or [1,0], then the "XOR" function would produce a value of 1, which would indicate that a 2S region is associated with the table entry 407. In one embodiment, a table entry 407 that includes bits [0,1] indicates that, of the four register entries 413 that correspond to the table entry 407, the first and second register entries 413 of the four corresponding register entries 413 are allocated to a 2S region that is associated with the table entry 407. Conversely, a table entry 407 that includes bits [1,0] indicates that, of the four register entries 413 that correspond to the table entry 407, the third and fourth register entries 413 of the four corresponding register entries 413 are allocated to a 2S region that is associated with the table entry 407. Again, in an alternative embodiment, a table entry 407 that includes bit values of [1,0] may indicate that the last two of the four corresponding register entries 413 are allocated to a 2S region that is associated with the table entry 407, and a table entry 407 that includes bits [0,1] may indicate that the first two of the four corresponding register entries 413 are allocated to a 2S region that is associated with the table entry 407.

Persons skilled in the art will recognize that different table sizes may be implemented for the register file mapping table 402 and the register file 408. For example, the register file 408 could include two-thousand and forty-eight register entries 413. The register file mapping table 402 would accordingly include one-hundred and twenty-eight rows 404 and four columns 406 of table entries 407, providing a total of five-hundred and twelve table entries 407, where each of the table entries 407 would correspond to four contiguous register entries 413 included in the register entries 413. In addition, the 4S and 2S regions may be decreased or increased in size to provide finer or coarser levels, respectively, of register entry 413 allocation granularity.

Register File Mapping Table Search Algorithms

Figure 5:
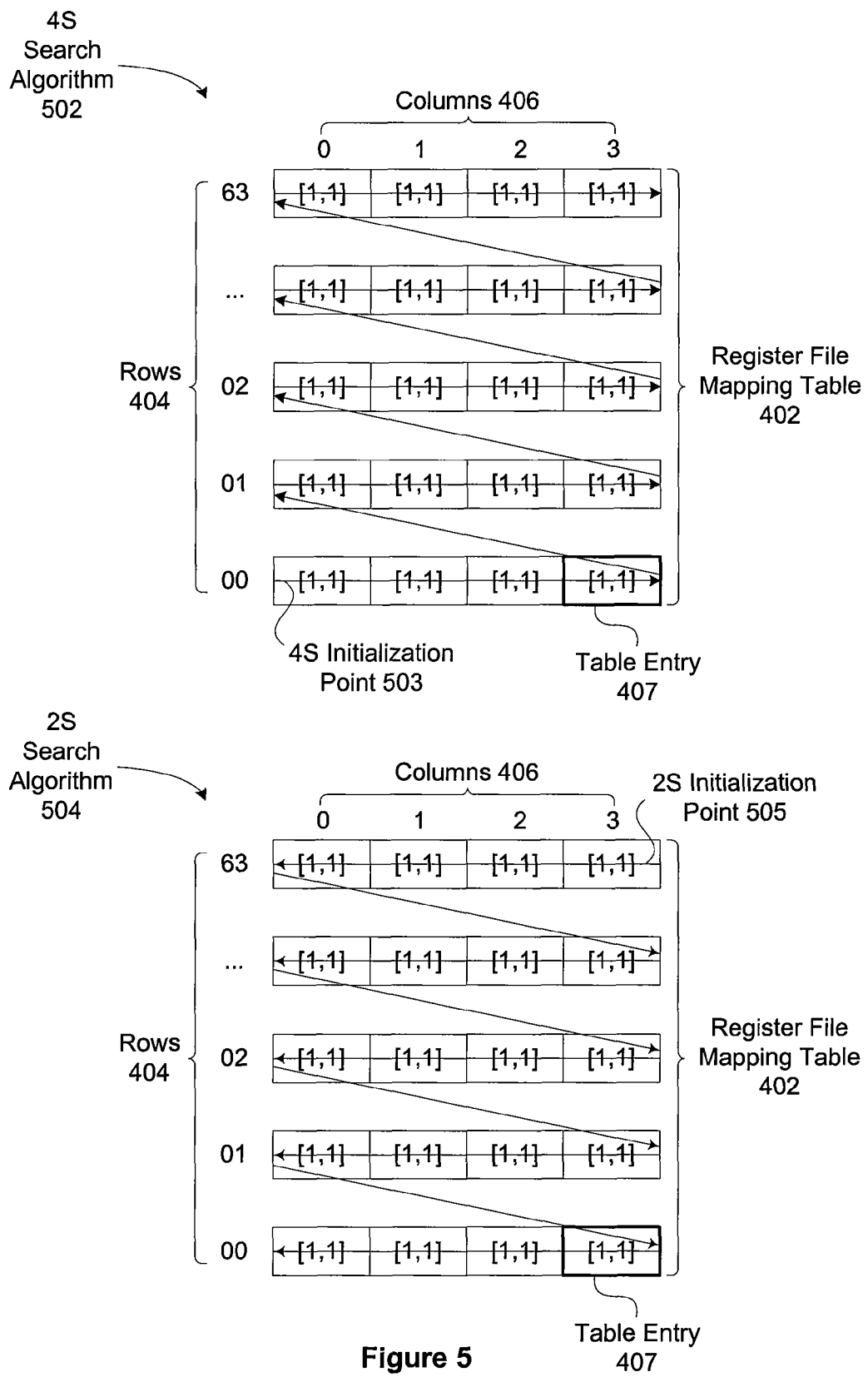
FIG. 5 illustrates a 4S search algorithm and a 2S search algorithm, according to various embodiments of the present invention.

FIG. 5 illustrates a 4S search algorithm 502 and a 2S search algorithm 504, according to various embodiments of the present invention. As shown, each of the 4S search algorithm 502 and the 2S search algorithm 504 parses the register file mapping table 402 of FIGS. 4A and 4B. In the particular example illustrated, each of the table entries 407 includes bits [1,1], causing each of the search algorithms to fully parse the mapping table 402.

The 4S search algorithm 502 begins at {row 00, column 0} and parses the register file mapping table 402 from left to right, bottom to top, as depicted by the directional arrows that extend from the 4S initialization point 503. Each of the table entries 407 is parsed in this fashion to search for any 4S regions that are available in the register file mapping table 402. Again, available 4S regions are determined by performing an "AND" function on the bits included in each of the table entries 407, as described above in FIG. 4A. Upon identifying an available 4S region, the bits included in the associated table entry 407 are updated from [0,0] to [1,1] to reflect the allocation of the 4S region. If additional 4S regions are required, the 4S search algorithm 502 begins searching the register file mapping table 402 at the table entry 407 that follows the table entry 407 which corresponds to the available 4S region that was previously identified.

Upon completion of the 4S search algorithm 502, the 2S search algorithm 504, if necessary, is performed on the register file mapping table 402. More specifically, the 2S search algorithm 504 is executed only when a number of register entries 413 requested by a thread group is not divisible by four. For example, if a thread group were to request fourteen register entries 413, then twelve of the required fourteen register entries 413 would be allocated using three 4S regions identified by the 4S search algorithm 502, and the remaining two of the required fourteen register entries 413 would be allocated using a 2S region identified by the 2S search algorithm 504.

The 2S search algorithm 504 begins at {row 63, column 3} and parses the register file mapping table 402 from right to left, top to bottom, as depicted by the directional arrows that extend from the 2S initialization point 505. Each of the table entries 407 is parsed in this fashion to search for any 2S regions that are available. Again, available 2S regions are determined by performing an "XOR" function on the bits included in each of the table entries 407, as described above in FIG. 4B.

In some embodiments, the 2S algorithm may parse the register file mapping table 402 twice, depending on whether any 2S regions are available within the register file mapping table 402. In such embodiments, if the 2S search algorithm 504 identifies a table entry 407 that includes two bits of opposite value—that is, a table entry 407 that is currently associated with a 2S region—then the 2S search algorithm 504 associates the table entry 407 with a second 2S region and reflects the association by updating the bit values included in the table entry 407 from [0,1] or [1,0] to [1,1]. If the 2S search algorithm 504 is unable to locate an available 2S region, then the 2S search algorithm 504 performs a secondary parse of the register file mapping table 402 to identify any available 4S regions that may be partially allocated by the required 2S region. Upon identifying such an available 4S region—that is, any table entry that includes bit values of [0,0]—the 2S search algorithm 504 updates the bit values to [1,0] or [0,1], depending on whether the first and second or third and fourth of the corresponding four register entries 413 are allocated to the 2S region.

Persons skilled in the art will recognize that different 4S and 2S search algorithms may be implemented for the register file mapping table 402. For example, the 4S and 2S search algorithms may be configured to parse the register file mapping table 402 in any technically feasible order.

Thread Group Lookup Table

Figure 6:
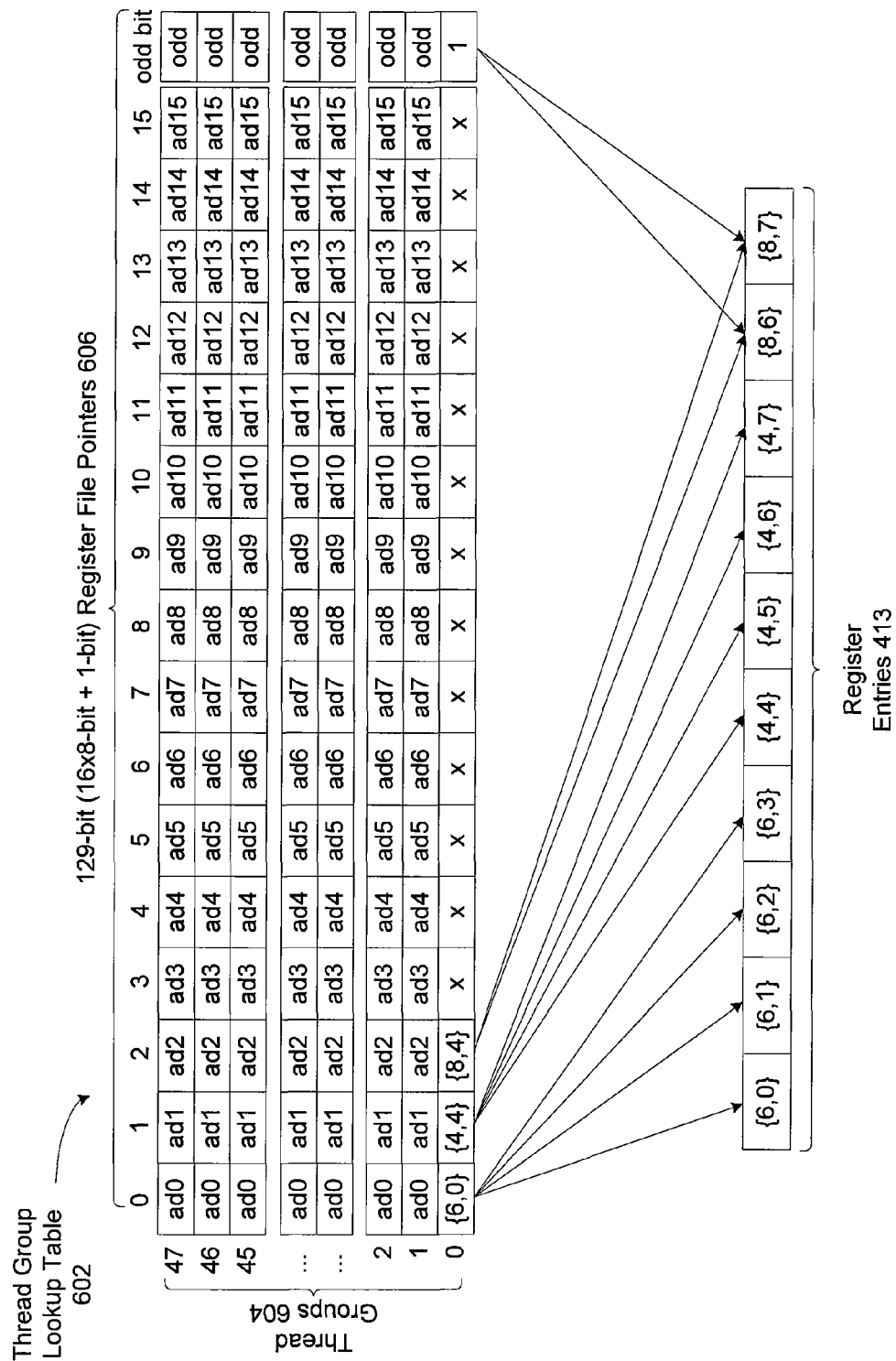
FIG. 6 illustrates a thread group lookup table, according to one embodiment of the present invention.

FIG. 6 illustrates a thread group lookup table 602, according to one embodiment of the present invention. As shown, the thread group lookup table 602 includes forty-eight register file pointers 606 that each correspond to a thread group 604. Each of the register file pointers 606 includes sixteen eight-bit entries and a single odd bit entry, resulting in a total size of 129 bits per register file pointer 606. This configuration allows each of the register file pointers 606 to be associated with two to sixty-four register file entries 413 since each of the sixteen eight-bit addresses included in the register file pointers 606 corresponds to four register file entries 413 included in the register file 408. As previously described, conventional mapping table implementations would normally require six hundred and forty bits for such a configuration, as opposed to the one hundred and twenty-nine bits required by the present invention.

The illustration of FIG. 6 depicts an example of a thread group 0 that is associated with ten register file entries 413 included in the register file 408. In this example, it is assumed that each of the ten register file entries 413 has been identified through by the search algorithms 502 and 504 described above in FIG. 5. As previously described herein, because the thread group 0 requires ten register file entries 413, the search algorithms were required to locate two available 4S regions and a single available 2S region and to store, within the pointer 606, the addresses of the register file entries 413 that correspond to the available 4S and 2S regions. In this example, a first 4S region has been located by the 4S search algorithm 502 and corresponds to the register entry 413 starting at {row 6, bank 0} of the register file 408. A second 4S region has been located by the 4S search algorithm 502 and corresponds to the register entry 413 starting at {row 4, bank 4} of the register file 408. Finally, a 2S region has located by the 2S search algorithm 504 and corresponds to the register entry 413 starting at {row 8, bank 4}.

The total number of register file entries 413 that are associated with the thread group 0 is not divisible by four, so the final entry of the register file pointer 606 included in the thread group 0 is inherently associated with a 2S region. Accordingly, the 2S region may correspond to either the register file entries 413 at ({row 8, bank 4}, {row 8, bank 5}) of the register file 408, or the register file entries 413 of ({row 8, bank 6}, {row 8, bank 7}) of the register file 408. As previously described herein, because, in this example, the odd bit is set to a value of 1, the 2S region corresponds to the last two of the four corresponding register files starting at {row 8, bank 4}:{row 8, bank 6} and {row 8, bank 7}, respectively.

Figure 7:
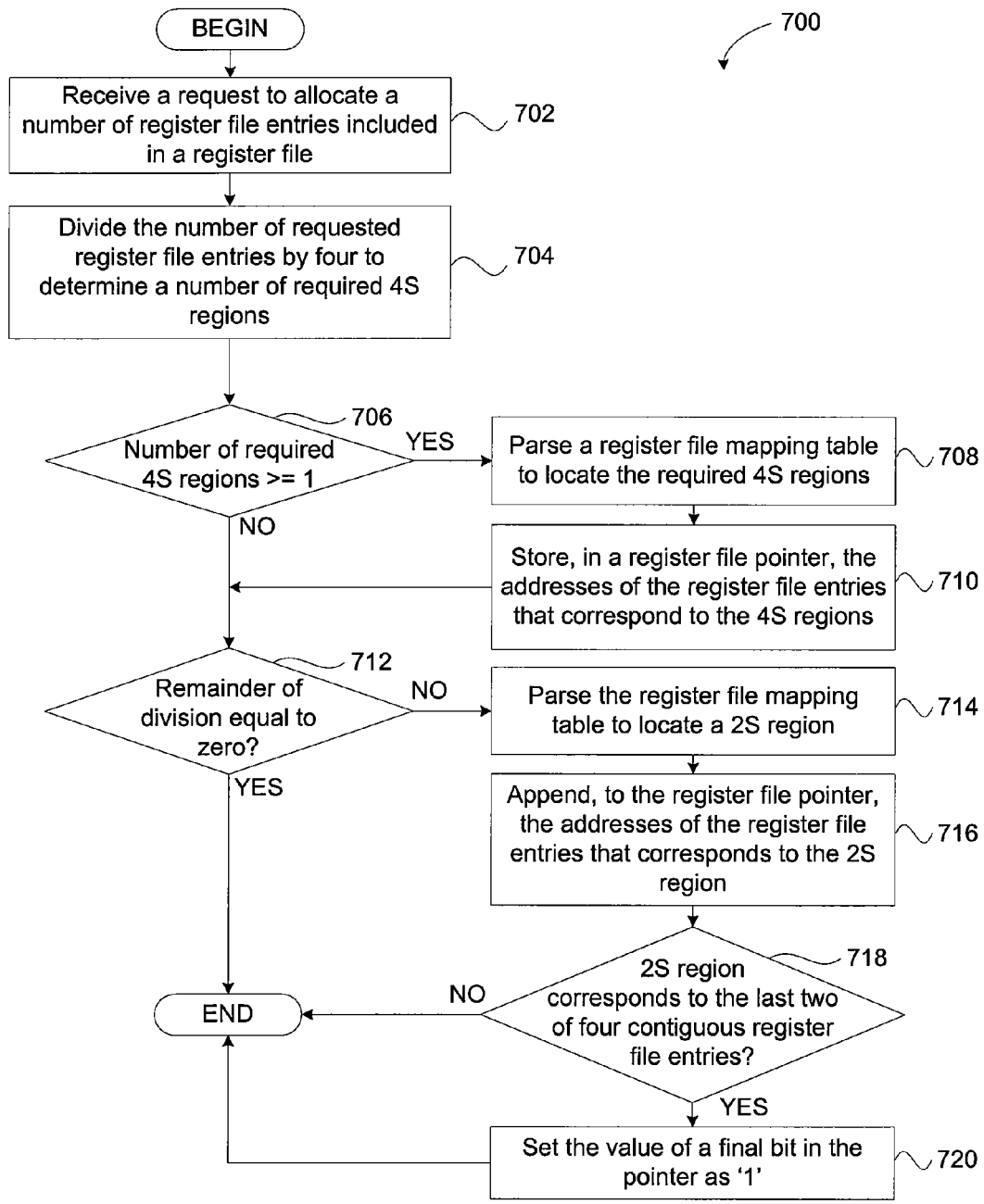
FIG. 7 is a flow diagram of method steps for allocating two or more physical register entries using a register file mapping table, according to one embodiment of the present invention.

FIG. 7 is a flow diagram of method steps 700 for allocating two or more register entries 413 using the register file mapping table 402, according to one embodiment of the present invention. Although the method steps are described in conjunction with the systems of FIGS. 1-6, persons skilled in the art will understand that any system configured to perform the method steps, in any order, is within the scope of the present invention. In one embodiment, the MMU 328 includes a register file allocator that executes the method steps 700.

The method begins at step 702, where the MMU 328 receives a request to allocate a number of register file entries 413 included in the register file 408. At step 704, the MMU 328 divides the number of requested register file entries 413 by four and takes the floor of the quotient to determine a number of required 4S regions.

At step 706, the MMU 328 determines whether the number of required 4S regions is greater than or equal to 1. If, at step 706, the MMU 328 determines that the number of required 4S regions is greater than or equal to one, then the method 700 proceeds to step 708. At step 708, the MMU 328 parses the register file mapping table 402 to locate the required 4S regions according to the 4S search algorithm 502 described in conjunction with FIG. 5.

At step 710, the MMU 328 stores, in a register file pointer 606, the addresses of the register file entries 413 that correspond to the required 4S regions.

Referring back now to step 706, if the MMU 328 determines that the number of required 4S regions is less than one, then the method 700 proceeds to step 712. At step 712, the MMU 328 determines whether the remainder of the division is equal to zero. If, at step 712, the MMU 328 determines that the remainder of division is not equal to zero, then the method 700 proceeds to step 714.

At step 714, the MMU 328 parses the register file mapping table 402 to locate a 2S region according to the 2S search algorithm 504 described in conjunction with FIG. 5. At step 716, the MMU 328 appends, to the register file pointer 606, the addresses of the register file entries 413 that correspond to the 2S region.

At step 718, the MMU 328 determines whether the 2S region is associated with the last two of the corresponding four contiguous register file entries 413. Again, this determination is made by performing an XOR of the bits that are included in a table entry 407. If, at step 718, the MMU 328 determines that the 2S region is associated with the last two of the corresponding four contiguous register file entries 413, then the method 700 proceeds to step 720, where the MMU 328 sets the value of a final bit in the register file pointer 606 to 1. Conversely, if the MMU 328 determines that the 2S region corresponds to the first two of four contiguous register file entries 413, then the MMU 328 sets the value of the final bit in the register file pointer 606 to 0, and the method 700 ends.

Referring back now to step 712, if the MMU 328 determines that the remainder of division is equal to zero, then no 2S region search is required, and the method 700 ends.

In sum, a technique is disclosed for reducing the memory that is required to implement allocations of register file entries included in a register file. A mapping table is updated to reflect whether register file entries included in the register file are free or allocated. Each entry of the mapping table corresponds to four contiguous register entries or two sets of two contiguous register entries, described herein as "4S" and "2S", respectively. An MMU receives a request to allocate a number of thread groups, and parses the mapping table to determine free 4S and 2S regions to meet the allocation request. The starting addresses of the contiguous register file entries that are associated with each of the determined 4S and 2S regions are maintained by the requesting entity in a register file pointer. The register file pointer maintains an odd bit that, in conjunction with the known total number of allocated register file entries, enables the MMU to determine whether the 2S region is associated with a first two of four consecutive register file entries or the last two of four consecutive register file entries.

One advantage of the disclosed systems and methods is that the non-linear allocation of register entries included in a register file reduces the fragmentation of the register file and enhances the speed in which memory allocation requests are met. Further, the 4S and 2S regions reduce the size of memory that is required to maintain the register file pointers.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for efficiently allocating register file entries included in a register file to a thread group, the method comprising:
   receiving, from the thread group, an allocation request to allocate a plurality of register file entries included in the register file to the thread group;
   determining a required number of mapping table entries included in a register file mapping table (RFMT) based on the request, wherein each mapping table entry included in the RFMT is associated with a different plurality of register file entries included in the register file;
   parsing the RFMT to locate a quantity of available mapping table entries in the RFMT equal to the required number of mapping table entries; and
   for each available mapping table entry in the quantity of available mapping table entries, associating with a register file pointer an address that corresponds to a first register file entry in the plurality of register file entries associated with the available mapping table entry.

2. The method of claim 1, wherein the number of register file entries allocated to the thread group, when divided by two, does not produce a remainder.

3. The method of claim 1, wherein each mapping table entry included in the RFMT corresponds to either a mapping table entry of a first type or a mapping table entry of a second type.

4. The method of claim 3, wherein the quantity of available mapping table entries includes a number of mapping table entries of the first type that is equal to an integer portion of a quotient value that is generated when the number of register file entries allocated to the thread group divided by four is not equal to zero.

5. The method of claim 3, wherein parsing the RFMT to locate the number of mapping table entries of the first type comprises identifying a mapping table entry in the RFMT that includes two bits of the same value.

6. The method of claim 3, wherein the quantity of available mapping table entries includes a mapping table entry of the second type when a remainder value that is generated by the number of register file entries allocated to the thread group divided by four is not equal to zero.

7. The method of claim 3, wherein parsing the RFMT to locate a mapping table entry of the second type comprises identifying a mapping table entry in the RFMT that includes two bits of opposite value.

8. The method of claim 3, wherein, when parsing the RFMT, if an available mapping table entry of the second type is not located then locating an available mapping table entry of the first type and converting the available mapping table entry of the first type to a mapping table entry of the second type.

9. The method of claim 3, wherein, upon parsing the RFMT and locating an available mapping table entry of the second type that resides within a first mapping table entry in the RFMT, if the available mapping table entry of the second type corresponds to a second half of the plurality of register file entries associated with the first mapping table entry then setting an odd bit included in the register file pointer to a value of one.

10. A memory management unit (MMU) configured to efficiently allocate register file entries included in a register file to a thread group, the MMU comprising:
   a register file allocator, configured to:
      receive, from the thread group, an allocation request to allocate a plurality of register file entries included in the register file to the thread group;
      determine a required number of mapping table entries included in a register file mapping table (RFMT) based on the request, wherein each mapping table entry included in the RFMT is associated with a different plurality of register file entries included in the register file;
      parse the RFMT to locate a quantity of available mapping table entries in the RFMT equal to the required number of mapping table entries; and
      for each available mapping table entry in the quantity of available mapping table entries, associate with a register file pointer an address that corresponds to a first register file entry in the plurality of register file entries associated with the available mapping table entry.

11. The MMU of claim 10, wherein the number of register file entries allocated to the thread group, when divided by two, does not produce a remainder.

12. The MMU of claim 10, wherein each mapping table entry included in the RFMT corresponds to either a mapping table entry of a first type or a mapping table entry of a second type.

13. The MMU of claim 12, wherein the quantity of available mapping table entries includes a number of mapping table entries of the first type that is equal to an integer portion of a quotient value that is generated when the number of register file entries allocated to the thread group divided by four is not equal to zero.

14. The MMU of claim 12, wherein parsing the RFMT to locate the number of mapping table entries of the first type comprises identifying a mapping table entry in the RFMT that includes two bits of the same value.

15. The MMU of claim 12, wherein the quantity of available mapping table entries includes a mapping table entry of the second type when a remainder value that is generated by the number of register file entries allocated to the thread group divided by four is not equal to zero.

16. The MMU of claim 12, wherein parsing the RFMT to locate a mapping table entry of the second type comprises identifying a mapping table entry in the RFMT that includes two bits of opposite value.

17. The MMU of claim 12, wherein, when parsing the RFMT, if an available mapping table entry of the second type is not located then locating an available mapping table entry of the first type and converting the available mapping table entry of the first type to a mapping table entry of the second type.

18. The MMU of claim 12, wherein, upon parsing the RFMT and locating an available mapping table entry of the second type that resides within a first mapping table entry in the RFMT, if the available mapping table entry of the second type corresponds to a second half of the plurality of register file entries associated with the first mapping table entry then setting an odd bit included in the register file pointer to a value of one.

19. A computing device configured to efficiently allocate register file entries included in a register file to a thread group, the computing device comprising:
- a host processor coupled to a main memory; and
- a graphics adapter having a memory management unit (MMU), the MMU comprising a register file allocator, wherein the register file allocator is configured to:
  - receive, from the thread group, an allocation request to allocate a plurality of register file entries included in the register file to the thread group;
  - determine a required number of mapping table entries included in a register file mapping table (RFMT) based on the request, wherein each mapping table entry included in the RFMT is associated with a different plurality of register file entries included in the register file;
  - parse the RFMT to locate a quantity of available mapping table entries in the RFMT equal to the required number of mapping table entries; and
  - for each available mapping table entry in the quantity of available mapping table entries, associate with a register file pointer an address that corresponds to a first register file entry in the plurality of register file entries associated with the available mapping table entry.

20. The computing device of claim 19, wherein each mapping table entry included in the RFMT corresponds to either a mapping table entry of a first type or a mapping table entry of a second type.

* * * * *